(No Model.) 3 Sheets—Sheet 1.
E. KNAPP.
BEAN PICKER AND SORTER.
No. 472,299. Patented Apr. 5, 1892.
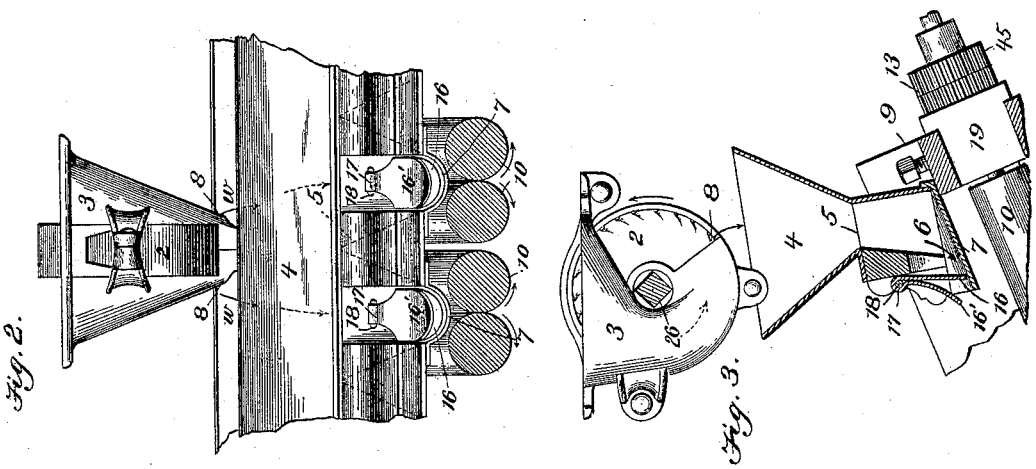
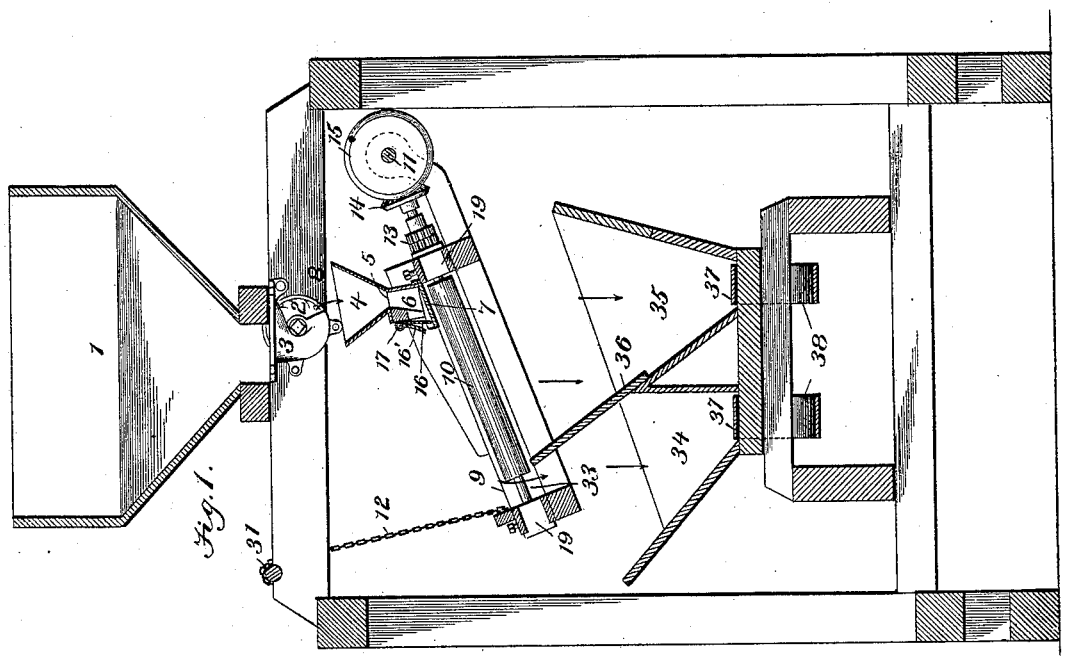
Witnesses
Inventor:
Edgar Knapp.
By Johnson & Johnson
his Attorneys.

(No Model.) 3 Sheets—Sheet 2.
E. KNAPP.
BEAN PICKER AND SORTER.
No. 472,299. Patented Apr. 5, 1892.
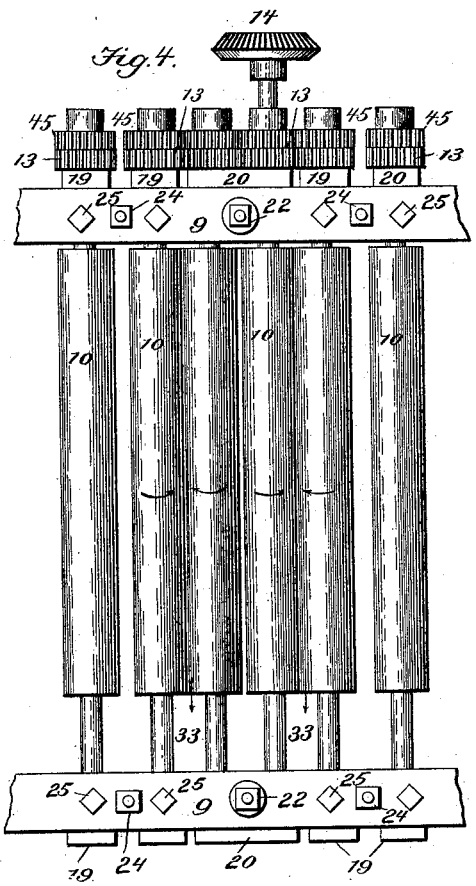
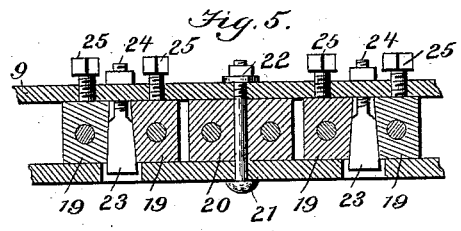

(No Model.) 3 Sheets—Sheet 3.
E. KNAPP.
BEAN PICKER AND SORTER.

No. 472,299. Patented Apr. 5, 1892.

Witnesses
Inventor
Edgar Knapp.
By Johnson & Johnson
his Attorneys

UNITED STATES PATENT OFFICE.

EDGAR KNAPP, OF MIDDLEPORT, NEW YORK.

BEAN PICKER AND SORTER.

SPECIFICATION forming part of Letters Patent No. 472,299, dated April 5, 1892.

Application filed October 29, 1891. Serial No. 410,215. (No model.)

*To all whom it may concern:*

Be it known that I, EDGAR KNAPP, a citizen of the United States, residing at Middleport, in the county of Niagara and State of New York, have invented a new and useful Improvement in a Machine for Picking and Sorting Beans, of which the following is a specification.

In an application for a patent filed by me February 6, 1891, under Serial No. 380,539, I have shown, described, and claimed certain inventions in an organized machine for picking and sorting beans as they come from the thrashing-machine for the purpose of separating the good and perfect from the blighted and bad and broken beans, the dirt, stones, and other foreign matters. My present invention is directed to improvements in such machine whereby it is rendered more effective in the particulars of feeding the beans to the pairs of rubber picking-rolls and of adjusting the same to suit the size and character of the beans, and in other particulars, which I shall now proceed to describe in connection with the accompanying drawings, and will specifically state in the concluding claims the precise matters which constitute my present improvements.

Figure 6:
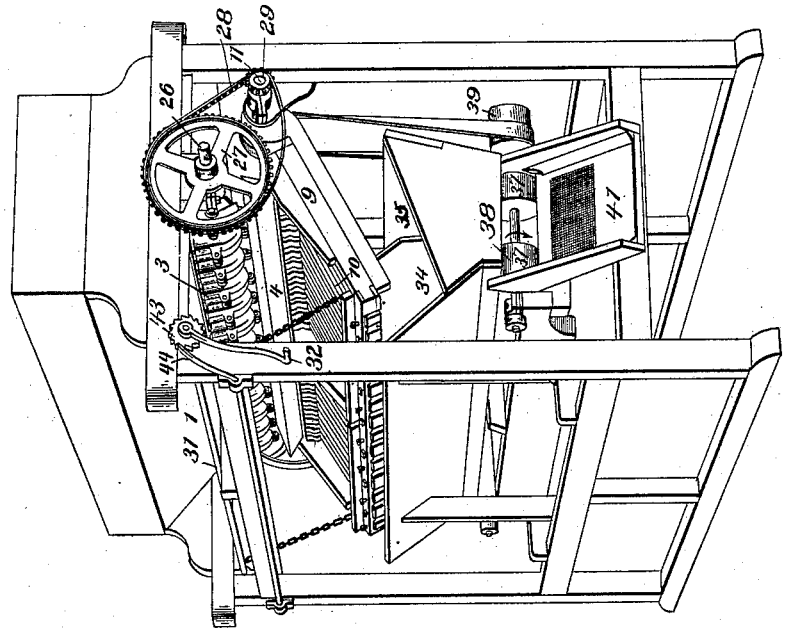
Figure 7:
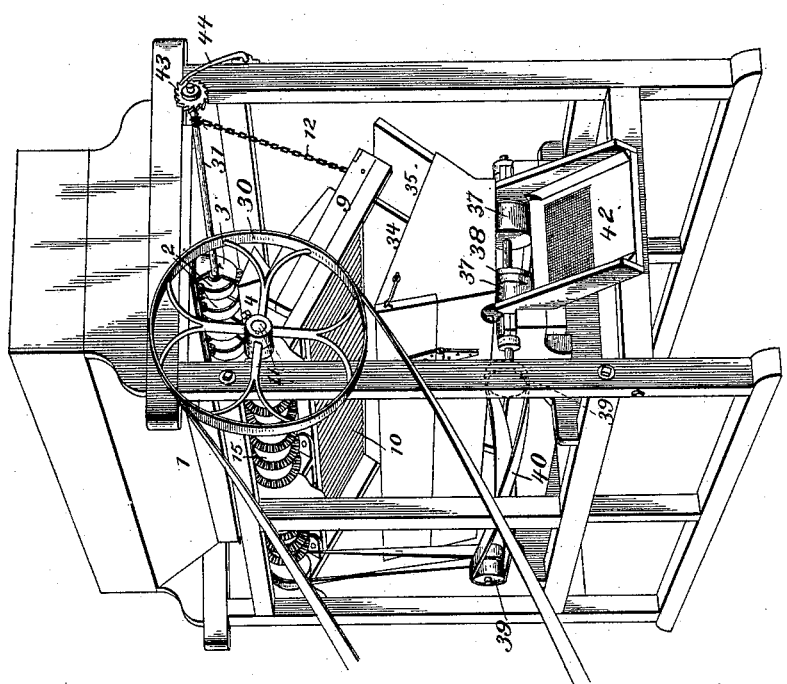

Referring to the drawings, Figure 1 represents a vertical transverse section of the machine, the section being taken between a pair of rubber picking-rolls and through a device of novel construction and relation thereto for distributing and regulating the feed of the beans to each pair of picking-rolls. Fig. 2 shows in front view two of such feed distributing and regulating devices each in its relation to a pair of rubber picking-rolls, and Fig. 3 is an enlarged vertical section of such feed distributing and regulating device in its relation to the picking-rolls and the forced feed device of the supply-hopper. Fig. 4 shows in top view a portion of the inclined platform or frame of rubber picking-rolls, and Fig. 5 shows in detail the provision for adjusting the boxes of the rolls of each pair. Fig. 6 represents in perspective view the complete machine, looking at the front and right end of the machine. Fig. 7 is a similar view looking at the rear and left end of the machine. In these perspective views the main frame is shown without panels to expose the interior mechanism.

A suitable frame or closure is constructed to contain in compact arrangement the supplying, picking, and sorting and collecting and delivering devices, according to the number of pairs of picking-rolls employed in the picking platform or surface. At the top and centrally of this frame a hopper is placed for containing and supplying the beans as they come from the thrasher. This hopper is provided with a rotating feed device, which may be located at the under side of the bottom of the hopper for delivering the beans therefrom by a forced feed. A distributing hopper or trough receives the beans from the hopper feed device and delivers them upon the upper ends of the picking and sorting rolls, which are arranged to incline downward toward the front of the machine and at right angles to the line of the distributing-hopper. Beneath the rolls are arranged hoppers to receive the picked and sorted beans, from which they are conveyed into separate receptacles. The rubber picking-rolls, the top supplying-hopper, and the bottom receiving-hoppers extend the length of the machine and in such relation that the distributing-hopper is arranged so as to feed the beans directly thereon in a way to obtain certain advantages.

Referring to the top supplying-hopper, it is preferably formed with divisions open at the bottom. A rotating feed device is provided for each bottom opening, which, as shown, is of a well-known construction and is secured to the under side of the hopper, so as to deliver its beans from its rear side into the distributing-hopper by means of a vertical feed-wheel 2, provided on its opposite faces with two independent annular chambers, which communicate with the bottom openings in the hopper. A feed-cup 3 is adapted to confine the wheel between them and to form a duplex feed-wheel, so that the beans entering the top of the cup will pass downward on opposite sides of the wheel into its respective channels, through which it is carried by the rotation of the wheel and continuously delivered at the rear of the cup in two streams, as indicated by the arrows $w$ $w$ in Fig. 2, and which are received into the distributing-hopper on each side of its V-shaped bottom divisions 5, from which it is distributed bean by bean upon the picking-rolls, as I will now describe. Just beneath these revolving feeding devices and in longitudinal line therewith I arrange a distributing-hopper 4, the outwardly-flaring walls of which are in such relation to the revolving feed device as to catch the beans delivered therefrom. The bottom portion of this distributing-hopper has transverse inverted-V-shaped partitions 5, so as to form comparatively narrow cross-channels 6, which open at the front side of the hopper and have their bottom surfaces 7 inclining downward and preferably extending in advance of said openings. The channels or basins 6 of this distributing-hopper are in coincident relation to the discharge-openings 8 of the forced-feed device, so that the beans from the latter will be received into the bottom basins or channels of the distributing-hopper for a purpose which I shall presently state in connection with the function of a free gravity-acting gate or stop which guards the opening of each channel.

Just beneath the distributing-hopper is arranged the frame 9 of picking-rolls 10 in a frontward downwardly-inclined position therefrom. This frame is hinged or mounted at its upper end, preferably, on a horizontal shaft 11, journaled in bearings at each end of and at the rear side of the main frame. The lower end of this frame of picking-rolls is preferably suspended from each corner by chains 12, whereby to adjust the inclination of the frame. I prefer to construct this frame of steel or iron bars, and within it the rolls 10 are journaled in pairs in boxes which are fitted in the side bars of the said frame and made adjustable in a way which I shall presently state. The rolls are of rubber with perfectly smooth and unbroken surfaces and fairly hard—that is, about 294° density—having a diameter of about an inch and a quarter to two inches and a speed of about seventy-five or eighty revolutions a minute.

While the rolls are comparatively hard, yet they are sufficiently elastic in use to yield sufficiently to permit of the defective beans, the stones, and dirt to be drawn down between them. At their upper ends the roll-shafts are geared together in sets of two pairs, so that the rolls of each pair rotate inwardly toward each other by means of pinions 13 of equal diameter. The shaft of one roll of each set, being extended, has a bevel-pinion 14, which, engaging with a bevel-gear 15 on the horizontal shaft 11, operates the rolls in pairs in the way stated. It is on this shaft that I prefer to mount the frame of the picking-rolls, so that the adjustment of the inclination of the frame will not derange the operating connections of the picking-rolls. Each pair of rolls is arranged mediately with each guarded opening of the distributing-hopper, and to obtain the best result I prefer to place the latter in close proximity to and over the ends of the picking-rolls and to mount said hopper directly upon the frame of the rolls, as shown in Fig. 1, so that the adjustment of the roll-frame will not change the relation of the rolls to the guarded openings of the distributing-hopper. It is obvious, however, that the distributing-hopper may have a fixed relation to the main frame instead of to the roll-frame.

The discharge-openings from the distributing-hopper are arranged in a horizontal plane along the front side thereof and correspond with the number of pairs of picking-rolls employed. Guarding each opening is a freely-acting gate or stop 16, preferably formed of a double plate bent so as to form a loop or eye 17, by which it is hung on a staple 18, so as to lie against the front wall of the hopper over and in front of said opening and closing therewith by gravity, and thereby serve to regulate the passage to the rolls of the beans, so that their flow thereto shall be regular. These gates or stops are made of sufficiently light and thin metal to just permit the beans as they pass out through the openings to push them outward to an extent sufficient only to allow the beans to pass outward singly and in a regular stream. I make the gate or stop of an outer and an inner leaf to give the advantage of adjusting its gravity, which may be effected by turning outwardly or upwardly, or both, the outer leaf 16', and thereby cause the gate to exert a greater inward pressure against the discharge of the beans at the opening. The action of these gravity-gates on the flow of the beans is as follows: The descending and outward movement of the beans from the hopper-channels 6 causes them to impinge against these gates or stops, and by reason of the force of gravity and also the pressure against it of the beans will push said gates outward until a bean is discharged beneath it. As the tendency of said gate is by reason of gravity to lie against and close to the opening, as soon as the bean passes free of the gate the latter will return toward its position of rest, and in doing so it encounters the next bean of the series in the stream and knocks against and thereby retards the movement of said bean to an almost inappreciable extent, yet sufficiently so to insure said bean passing with a regular and steady movement to the rolls. In this gravity action of the gate it is important to notice that the extension of the bottom of the hopper-channel beyond the outer end of the opening of said channel serves to hold the beans on the bottom of the channel outside of the opening and thereby cause it to be quite free of the opening before it can pass under the gate and pass off at the end of the bottom of the channel. For this purpose I prefer to recess the front of the hopper at each opening and to hang the gates in these recesses, so that the sides of these recesses will be on each side of the bottom extension, which extends out from the hopper like the end of a gutter. This construction allows each bean to be clear of the hopper-opening before it drops therefrom, and thereby insures the dropping of one bean at a time upon the rolls. This prevents the beans from dropping upon the rolls with such force as to rebound therefrom, as they will be caused to drop thereon gently one by one, and thereby be made to descend by a sliding movement in a single line between the rolls, so that each bean will have full contact on each of its flat sides with the surface of each roll to effect the peculiar picking and sorting operation, as I will now state.

As the beans slide down in the trough formed by and between each pair of rolls the rotation of the latter will cause them to seize and grip the bad beans by reason of their roughness, broken, or soft blighted condition and carry them down between the rolls to be delivered into a receptacle, while the good beans—those with sound and smooth skins—will resist with a sort of repellent action the biting or seizing tendency of the rolls and will gradually slide down in the trough over the roll-surfaces and be delivered therefrom at their lower ends into a separate receptacle, and thereby both pick and sort or grade the beans. In this picking operation the good hard-surfaced beans will act with a free slipping action over the roll-surfaces, while the downward inclination of the latter will give the line of beans a sliding movement down the trough, so that should there be a rough, soft, or broken bean in the line between two smooth beans the bad bean will be picked from between the good ones and carried down through and between the rolls. In this manner, also, dirt, stones, and other foreign matter will be freed from the good beans. For this purpose it is important that each pair of the picking-rolls be arranged in a transverse plane, so that the walls of the troughs formed by the rolls shall be of equal height, that the rolls shall be journaled in relatively-fixed bearings, so that they shall not yield or spread apart, except in their surfaces, for the purpose stated, and to obtain this yielding biting pressure to the best degree the rubber rolls must be as solid as possible and perfectly cylindrical, and the cross-area of the trough formed thereby adjusted or set to form a holding-trough to suit the size of the beans—that is to say, for picking comparatively small beans the rolls should be set in contact with each other; but for larger beans the rolls should be set with their walls slightly separated—this to insure the slipping action of the sound beans. For this purpose I provide for adjusting the roll-boxes, and thereby obtain the advantage of adapting a single machine for picking and sorting beans of different sizes.

The rolls are geared in sets of four, making two pairs. The outside rolls of the set are journaled in separate boxes 19, and the two inside rolls are journaled in one single box 20 at each end, and which latter boxes are permanently secured in the frame by bolts 21 with nuts 22. It is the bevel-gear of one of these two inside rolls which engages with the bevel-gear of the driving-shaft, so as to cause each pair of rolls to revolve inward. This arrangement brings the rolls which are mounted in the single boxes in each set next to the outside rolls of the next adjacent set, and it is these rolls which are outside that I make adjustable in their relation to the two inner rolls of each set. For effecting this adjustment I provide a wedge 23 between the two single boxes, so as to bear against and move them nearer to the fixed double boxes 20 to bring the inward turning pairs of rolls nearer together for the purpose stated. The wedges are provided with screw-stems 24, which pass through the frame and have nuts by which they can be set up or down between the boxes, and to allow such adjustment the wedges may be fitted in slots in one side of the frame. Screws 25 are provided in the frame for clamping the single boxes when set. In this way the frames may be provided with any number of sets of picking-rolls all driven from the main shaft at the same speed and the rolls adjusted to suit large or small beans, as stated.

The duplex feed-wheels of the supply-hopper are fitted upon a shaft 26, which is journaled in the main frame and which is driven by a sprocket-wheel 27 and chain 28, engaging with a sprocket-pinion 29 on the shaft which operates the rolls, as shown in Fig. 6, and which latter shaft is itself driven by a band-wheel 30, as seen in Fig. 7. The gearing of these two shafts is so proportioned as to cause the rolls to have a greater speed than the duplex feed-wheels of the supply-hopper, so that the feed from the latter will be only sufficient to keep the distributing-hopper constantly supplied, so that the feed therefrom will also be continuous.

I provide for adjusting the inclination of the picking-roll frame by connecting the suspension-chains with a rod 31, fitted on the top of the frame and having a crank 32, by which to turn it to wind and unwind the chain, which will correspondingly raise or lower the lower end of the roll-frame. This adjustment of the angle or inclination of the roll-frame is important to regulate the speed of the descent of the beans down the trough formed by the picking-rolls to suit the feed of the beans from the distributing-hopper and also the size of the beans. For poor beans the angle should be less to give a slower descent than for good beans. The speed of the feed from the supply-hopper is in proper ratio to the speed of the feed from the distributing-hopper, and this latter feed is in proper ratio to the speed of the feed down the rolls, so that in this latter feed the beans will descend in single lines down the walls of each pair of picking-rolls without falling on or riding over each other, so that each bean will be separately and distinctly subjected to the action of the surface of both rolls of the pair, so that there will be no overflow down or over the rolls and no overflow from the top of the distributing-hopper. In this way the beans are both picked and sorted mechanically.

Referring to Figs. 1 and 4, it will be seen that the rolls do not extend down to the lower frame-bar, but leave a space 32 on the inner side of the latter, through which the good beans fall from the ends of the rolls into the hopper 34, while the bad beans, dirt, and other foreign matters which are drawn down through and between the rolls drop into a separate hopper 35, the inner or dividing wall 36 of said hoppers for that purpose being extended up to the lower ends of the rolls. These hoppers are parallel to and join each other and are each provided with an endless apron 37, which forms its bottom, has a length equal to that of the roll-frame, and serves to carry the beans in opposite directions from each hopper into separate receptacles. This separate delivery of the beans I provide for by causing the conveyer-belts to travel in opposite directions on rolls 38, carried by the shafts journaled in the lower portion of the main frame. Each of these shafts has a small pulley 39 on its end at the rear side of the machine, which are connected by a crossed belt 40, (see Fig. 7,) whereby one shaft is caused to revolve to the right and the other to the left and the conveyer-belts in corresponding directions. This requires one of the rolls of each belt to be loose on its shaft, so that one roll only of each shaft will drive the belt on said roll. In explanation of this let the roll 38 (seen in Fig. 6) be fast and turning to the right. Its front conveyer-belt will deliver the good beans upon a chute 41 at the right end of the machine. While the roll 38 (seen in Fig. 7) is fast and turns to the left, its rear conveyer-belt will deliver the bad beans upon a chute 42 at the left end of the machine. Each chute has a screen-surface to separate the dirt from the beans as they pass through the chute.

The chain-connected rod 31 may have a ratchet-wheel 43 on each end, engaged by the crank-arms or pawls 44 of a rod attached to the frame to hold the winding-rod 31 when the picking-roll frame is adjusted.

Referring to the adjusting-wedges, it is obvious that the sides of the roll-boxes may be beveled to correspond to the bevel of the wedge, and that the latter may be placed so that its adjusting-shank will stand downward. The dividing-board of the twin conveyer-hoppers may be made removable and the back board of the rear hopper may be hinged for access to the hoppers.

The shafts of the duplex feed-wheels and the driving-shaft for the picking-rolls may be engaged by spur-gear instead of the sprocket chain-wheels.

While I have provided for the adjustment of the roll-boxes for the purpose stated, I may say that such adjustment is so slight as not to affect the effective intermeshing of their operating-pinions, as the teeth of the latter are of sufficient width to admit of such adjustment. The cogs are also a considerable distance apart, and in order to provide against lost motion of the rolls by reason of such wide spaces between the cogs I use two such pinions for each roll, the teeth of such supplemental pinions 45 being opposite the spaces between the teeth of the other pinions, and thereby give a continuous motion to the rolls and provide greater strength for the roll-gear than could be obtained by pinions of finer cogs. Besides, the coarse pinions of cast-iron are cheaper and, being arranged in double rows, reinforce each other.

By the employment of machines constructed and operating as described I have been enabled to do the work in the same period of time accomplished by at least forty hand-pickers and in a superior manner, as the action of the machine has the effect of brightening and cleaning the beans by reason of their sliding movement down the rolls, and the revolving action of the walls of the rolls against the sides of the beans together will produce a rubbing action in two directions on the sides of each bean.

It is evident that immaterial departures may be permitted from the general construction and arrangement of parts contributing toward my invention, and for this reason I do not wish to be understood as limiting myself thereto in precise detail.

I claim as my invention—

1. In a machine for picking and sorting beans, the combination of an inclined platform comprising rubber rolls arranged to operate in pairs, a supply-hopper having rotating feed devices, and an intermediate distributing-hopper having an automatic swinging feed-regulating gate or stop device arranged at the side thereof and mediately of each pair of picking-rolls, substantially as described.

2. In a machine for picking and sorting beans, the combination of an inclined platform comprising rubber rolls arranged to operate in pairs, a supply-hopper having rotating feed devices, and an intermediate distributing-hopper having bottom side discharges, and a gravity-acting feed regulating or stop device arranged to guard such openings mediately of each pair of picking-rolls, substantially as described, for the purpose stated.

3. A device for picking and sorting beans, consisting of a supply-hopper having a series of duplex feed-wheels, a distributing-hopper having bottom troughs coincident with the feed-channels of the duplex wheels and opening at the side of said hopper, an automatic swinging gate or stop arranged to guard each hopper-opening, and an inclined platform comprising rubber rolls, arranged in pairs mediately with each swinging gate or stop for operation in the way described.

4. A device for picking and sorting beans, consisting of an inclined platform comprising rubber rolls arranged in pairs in a frame, and a distributing-hopper carried by said frame, having transverse bottom troughs open at the side mediately with each pair of rolls, and a gravity-acting gate or stop for guarding each hopper-opening, arranged in close proximity to the upper ends of said rolls for operation in the way described.

5. A platform or surface for picking beans, comprising a frame, rubber rolls arranged therein in pairs, having unbroken surfaces transversely in horizontal planes on a downward longitudinal inclination and revolved in oppositely-inward directions, fixed and adjustable boxes for said rolls, and a wedge device between each pair of adjustable boxes, in combination with suitable distributing-conduits for each pair of rolls, substantially as described, for the purpose specified.

6. In a bean picker and sorter, the combination of a distributing-hopper having a downwardly-inclined bottom open at the side thereof, and a gravity gate or stop device formed of two leaves for guarding said opening with a platform of rubber rolls arranged in pairs mediately with said gate or stop arranged to incline downward from said hopper-gate for operation in the way described.

7. In a feeder for bean-pickers, a hopper having its bottom formed of transverse parallel troughs or gutters, open at one end, inclining downward to said opening, and extending beyond the walls thereof, in combination with a gravity gate or stop device hung so as to have a swinging movement over and outward from said trough-extension for operation in the way described.

In testimony whereof I have signed this specification in the presence of two subscribing witnesses.

EDGAR KNAPP.

In presence of—
 GEO. F. THOMPSON,
 ARTHUR O. LEWIS.